US012810687B2

(12) United States Patent
Bolling, Jr. et al.

(10) Patent No.: US 12,810,687 B2
(45) **Date of Patent: *Nov. 24, 2026**

(54) SYSTEMS AND METHODS FOR UTILIZING HISTORICAL GAME DATA FOR SUBSEQUENT GAMEPLAY

(71) Applicant: Aristocrat Technologies, Inc., Las Vegas, NV (US)

(72) Inventors: T. Grant Bolling, Jr., Maryland Heights, MO (US); Kevin Walsh, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 268 days.

This patent is subject to a terminal disclaimer.

(21) Appl. No.: 18/603,906

(22) Filed: Mar. 13, 2024

(65) Prior Publication Data

US 2024/0221467 A1 Jul. 4, 2024

Related U.S. Application Data

(63) Continuation of application No. 17/679,578, filed on Feb. 24, 2022, now Pat. No. 11,961,367.

(Continued)

(51) Int. Cl.

| | |
|---|---|
| ***A63F 9/24*** | (2006.01) |
| ***A63F 11/00*** | (2006.01) |

(Continued)

(52) U.S. Cl.

CPC .......... *G07F 17/3267* (2013.01); *G06F 7/588* (2013.01); *G07F 17/3211* (2013.01)

(58) Field of Classification Search

CPC .. G07F 17/32; G07F 17/3211; G07F 17/3214; G07F 17/3222

(Continued)

(56) References Cited

U.S. PATENT DOCUMENTS

| | | | | |
|---|---|---|---|---|
| 8,267,764 B1 | 9/2012 | Aoki | | |
| 11,961,367 B2 * | 4/2024 | Bolling, Jr. | ......... | G07F 17/3211 |

(Continued)

OTHER PUBLICATIONS

Office Action (Non-Final Rejection) dated Mar. 28, 2023 for U.S. Appl. No. 17/679,578 (pp. 1-6).

(Continued)

*Primary Examiner* — Adetokunbo O Torimiro

(74) *Attorney, Agent, or Firm* — Armstrong Teasdale LLP

(57) ABSTRACT

An electronic gaming device is described. The electronic gaming device includes a display device including a first display area and a second display area and at least one processor configured to execute instructions. The instructions, when executed, cause the at least one processor to determine a first game outcome and cause display of a first game outcome amount in the first display area. The instructions also cause the at least one processor to cause display of the first game outcome amount in the second display area, the second display area including a plurality of past game outcome amounts. The instructions further cause the at least one processor to determine a second game outcome, provide a second game outcome amount, and, based upon the second game outcome including a trigger event, provide a past game outcome amount of the plurality of past game outcome amounts.

20 Claims, 11 Drawing Sheets

Related U.S. Application Data

(60) Provisional application No. 63/155,640, filed on Mar. 2, 2021.

(51) Int. Cl.

| | |
|---|---|
| ***G06F 7/58*** | (2006.01) |
| ***G06F 13/00*** | (2006.01) |
| ***G06F 17/00*** | (2019.01) |
| ***G07F 17/32*** | (2006.01) |

(58) Field of Classification Search
USPC .............................. 463/1, 20, 22, 25, 30, 39
See application file for complete search history.

(56) References Cited

U.S. PATENT DOCUMENTS

2005/0055113 A1 3/2005 Gauselmann
2008/0268931 A1* 10/2008 Alderucci ........... G07F 17/3209 463/36
2011/0021266 A1* 1/2011 Jaffe ................... G07F 17/3258 463/30
2012/0270639 A1* 10/2012 Walker ................ G07F 17/3244 463/25

OTHER PUBLICATIONS

Office Action (Final Rejection) dated Sep. 14, 2023 for U.S. Appl. No. 17/679,578 (pp. 1-7).
Office Action (Notice of Allowance and Fees Due (PTOL-85)) dated Jan. 30, 2024 for U.S. Appl. No. 17/679,578 (pp. 1-5).

* cited by examiner

SYSTEMS AND METHODS FOR UTILIZING HISTORICAL GAME DATA FOR SUBSEQUENT GAMEPLAY

CROSS REFERENCE TO RELATED APPLICATIONS

This application is a continuation of and claims priority to U.S. patent application Ser. No. 17/679,578, filed Feb. 24, 2022, which claims the benefit of priority to U.S. Provisional Patent Application No. 63/155,640, filed Mar. 2, 2021, the contents of which are hereby incorporated by reference herein in their entireties.

TECHNICAL FIELD

The field of disclosure relates generally to electronic gaming, and, more particularly, to systems and methods for utilizing historical game data for subsequent gameplay.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device is described. The electronic gaming device includes a display device including a first display area and a second display area and at least one processor configured to execute instructions. The instructions, when executed, cause the at least one processor to determine a first game outcome including a first game outcome amount and cause display of the first game outcome amount in the first display area. The instructions also cause the at least one processor to cause the first game outcome amount to be added to a data register of a plurality of data registers, cause display of the first game outcome amount in the second display area, the second display area including a plurality of past game outcome amounts stored in the plurality of data registers and including the first game outcome amount wherein each past game outcome amount of the plurality of past game outcome amounts displayed in the second display area is stored in a respective data register of the plurality of data registers and is eligible to be presented as a repeated outcome by the at least one processor. The instructions further cause the at least one processor to determine a second game outcome wherein the second game outcome includes a second game outcome amount and a trigger event corresponding to the plurality of past game outcomes displayed in the second display area, provide the second game outcome amount, and, based upon the second game outcome including the trigger event, provide a past game outcome amount of the plurality of past game outcome amounts.

In another aspect, an electronic gaming system including at least one processor in communication with at least one memory with instructions stored thereon is described. The at least one processor is configured to execute the instructions which cause the at least one processor to determine a first game outcome including a first game outcome amount, provide the first game outcome amount in a first area, provide the first game outcome amount to a data register of a plurality of data registers, and provide the first game outcome amount in a second area, the second area including a plurality of past game outcome amounts stored in the plurality of data registers and including the first game outcome amount, wherein each past game outcome amount of the plurality of past game outcome amounts in the second area is stored in a respective data register of the plurality of data registers and is eligible to be presented as a repeated outcome. The instructions further cause the at least one processor to determine a second game outcome wherein the second game outcome includes a second game outcome amount and a trigger event corresponding to the plurality of past game outcomes in the second area, present the second game outcome amount, and in response to the second game outcome including the trigger event, present a past game outcome amount of the plurality of past game outcome amounts.

In yet another aspect, a non-transitory computer-readable storage medium with instructions stored thereon is described. The instructions, in response to execution by at least one processor, cause the at least one processor to determine a first game outcome including a first game outcome amount, add the first game outcome amount to a first section, add the first game outcome amount to a data register of a plurality of data registers, add the first game outcome amount to a second section, the second section including a plurality of past game outcome amounts stored in the plurality of data registers and including the first game outcome amount, wherein each past game outcome amount of the plurality of past game outcome amounts in the second section is stored in a respective data register of the plurality of data registers and is eligible to be provided as a repeated outcome. The instructions further cause the at least one processor to determine a second game outcome, wherein the second game outcome includes a second game outcome amount and a trigger event associated with the plurality of past game outcomes in the second section, provide the second game outcome amount, and based upon the second game outcome including the trigger event, provide a past game outcome amount of the plurality of past game outcome amounts.

DETAILED DESCRIPTION

Figure 1:
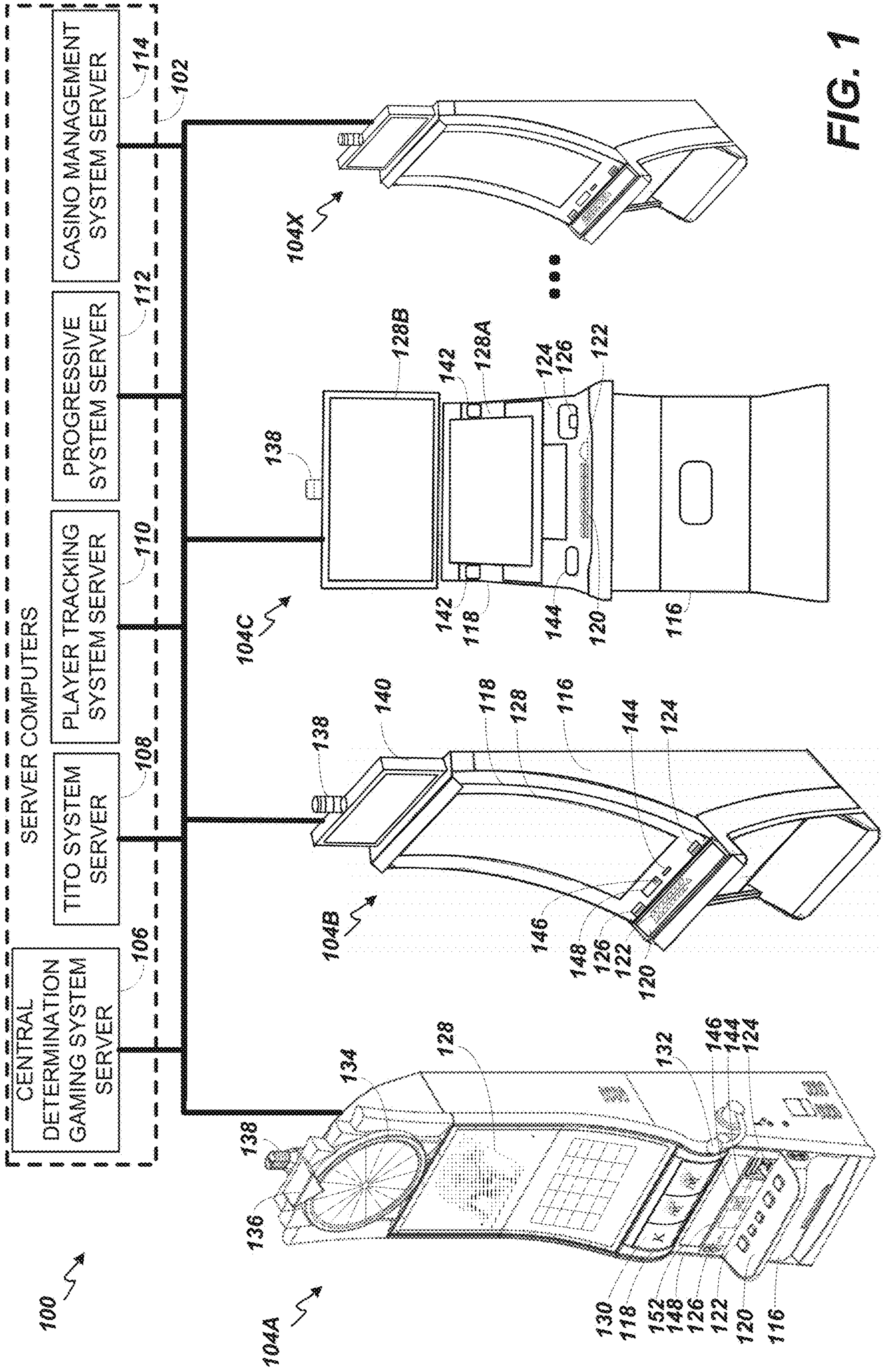
FIG. 1 is an exemplary diagram showing several EGMs networked with various gaming related servers.

Embodiments of the present disclosure provide systems and methods for utilizing historical game data for subsequent gameplay. In an example embodiment, an electronic game is provided on a display device in a first display area. Each instance of the electronic game provides a game outcome including, for example, a credit amount (e.g., and this is where a conventional game would end—an outcome of a game, such as a credit amount, being provided). A representation of each recent game outcome is displayed to a player (e.g., as a list/queue in a second display area on the display device and/or on a separate display device). The representations of each recent game outcome may be limited to a predefined number of game outcomes (e.g., a listing of the 10 most recent game outcomes). In some embodiments, only representations of recent winning game outcomes may be displayed on the list/queue (e.g., non-zero outcomes). In some embodiments, only recent game outcomes above a certain threshold may be displayed on the list. The list may be dynamically updated to display only a predefined number of wins, while previous wins (e.g., the eleventh win if the list displays ten wins) "fall off" the list and are no longer displayed and/or eligible to be presented as a repeated win.

In the example embodiment, each game outcome displayed in the second display area is stored in one or more data registers in memory. For example, each game outcome amount displayed in the second display area may be stored in its own data register and/or the same data register as the other displayed game outcome amounts. In some embodiments, one data register corresponds to one display position in the second display area. For example, a left-most displayed game outcome may correspond to a first data register, a game outcome displayed adjacent the left-most displayed game outcome may correspond to a second data register, and an Nth displayed game outcome (e.g., the right-most displayed game outcome), may correspond to an Nth data register (e.g., wherein N is the total number of displayed game outcomes). Accordingly, as new outcome amounts are added to the second display area and shift other game outcomes (e.g., as described below with respect to FIGS. 4-6), the corresponding game outcomes stored in memory may shift data registers such that the new left-most displayed outcome is stored in the first data register and the new right-most displayed outcome is stored in the Nth data register. In other words, the data registers are dynamically updated with new outcome amounts and, accordingly, the displayed outcome amounts are dynamically updated in coordination with the data registers. The use of data registers in this manner allows for the present embodiments to more-efficiently provide repeated wins.

In some embodiments, sets of data registers are associated with at least one of a player account, an electronic gaming device, or an input amount. For example, a first set of data registers may be associated with repeated wins associated with a player account, a second set of data registers may be associated with repeated wins associated with an electronic gaming device, and a third set of data registers may be associated with repeated wins associated with a certain input (e.g., bet, wager) amount/level, and/or any combination thereof. In some embodiments, sets/pluralities of data registers may be persistently stored (e.g., so that the data registers store repeated wins specific to the player account, gaming device, bet level, etc. regardless of the amount of time that passes before a next play of a game). In some embodiments, sets/pluralities of data registers may be reset to a predetermined amount the occurrence of a trigger event (e.g., a threshold amount of time passing without a new play of a game being played).

Further, in the example embodiment, each game outcome displayed in the second display area is eligible to be presented to the player as a repeated win. In some embodiments, the best game outcome on the list (e.g., the game outcome associated with the highest credit amount on the list) may be associated with an animation/indicator to attract player attention to the high win (e.g., the best game outcome may be bold, highlighted, have an animation surrounding and/or overlaying the representation of the game outcome, etc.). Accordingly, player attention is drawn to the list and the high win such that players will be excited at the chance to re-win the high win before it falls off the list (e.g., is no longer displayed) and is no longer eligible to be won as a repeated win.

In the example embodiment, a game outcome displayed in the second display area may be awarded in response to detection of a trigger event in an electronic game (e.g., a certain combination of displayed symbols, a certain trigger symbol, a certain amount of time passing, etc.). In some embodiments, the repeated win awarded/presented in response to the trigger event may be the highest game outcome displayed in the second display area (e.g., associated with the highest credit amount). In some embodiments, the repeated win awarded/presented in response to the trigger event may be randomly determined from the plurality of game outcomes displayed in the second display area (e.g., based upon a random number generator (RNG) output).

At least some of the technical problems addressed by this disclosure include: (a) inability of current systems to provide repeated outcomes/awards in an efficient manner; (b) inability of current systems to provide a highest/most valuable repeated outcome in an efficient manner; (c) inability of current systems to display previous wins/persistent wins to a player; (d) inability of current systems to present repeated wins without significant changes to current systems; and (e) inability of current systems to track and present repeated wins across a plurality of platforms (e.g., land-based and mobile).

The technical effects and advantages achieved by this disclosure include: (a) ability to provide repeated outcomes/awards in an efficient manner because of the implementation of data registers configured to store and/or track repeated wins; (b) ability to provide a highest/most valuable repeated outcome in an efficient manner by the use of data registers as described herein; (c) ability to display and attract player attention to previous wins/persistent wins to a player because of the use of data registers as described herein; (d) ability of current systems to present repeated wins without significant changes to current systems because of the ability to implement the dynamic data registers with any current game; and (e) ability to track and present repeated wins across a plurality of platforms (e.g., land-based and mobile).

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
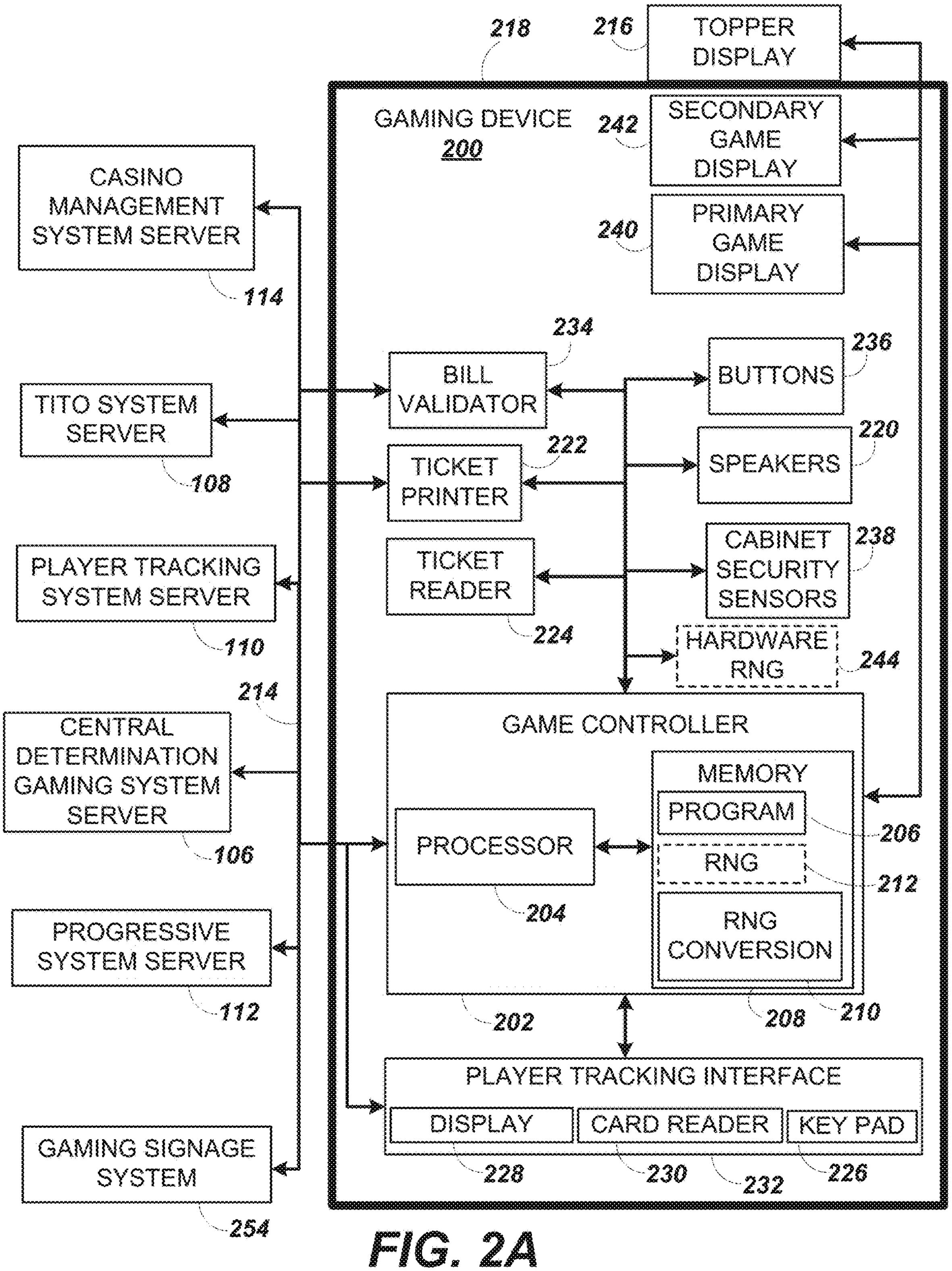
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating, e.g., Bingo cards and bingo game ball calls. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
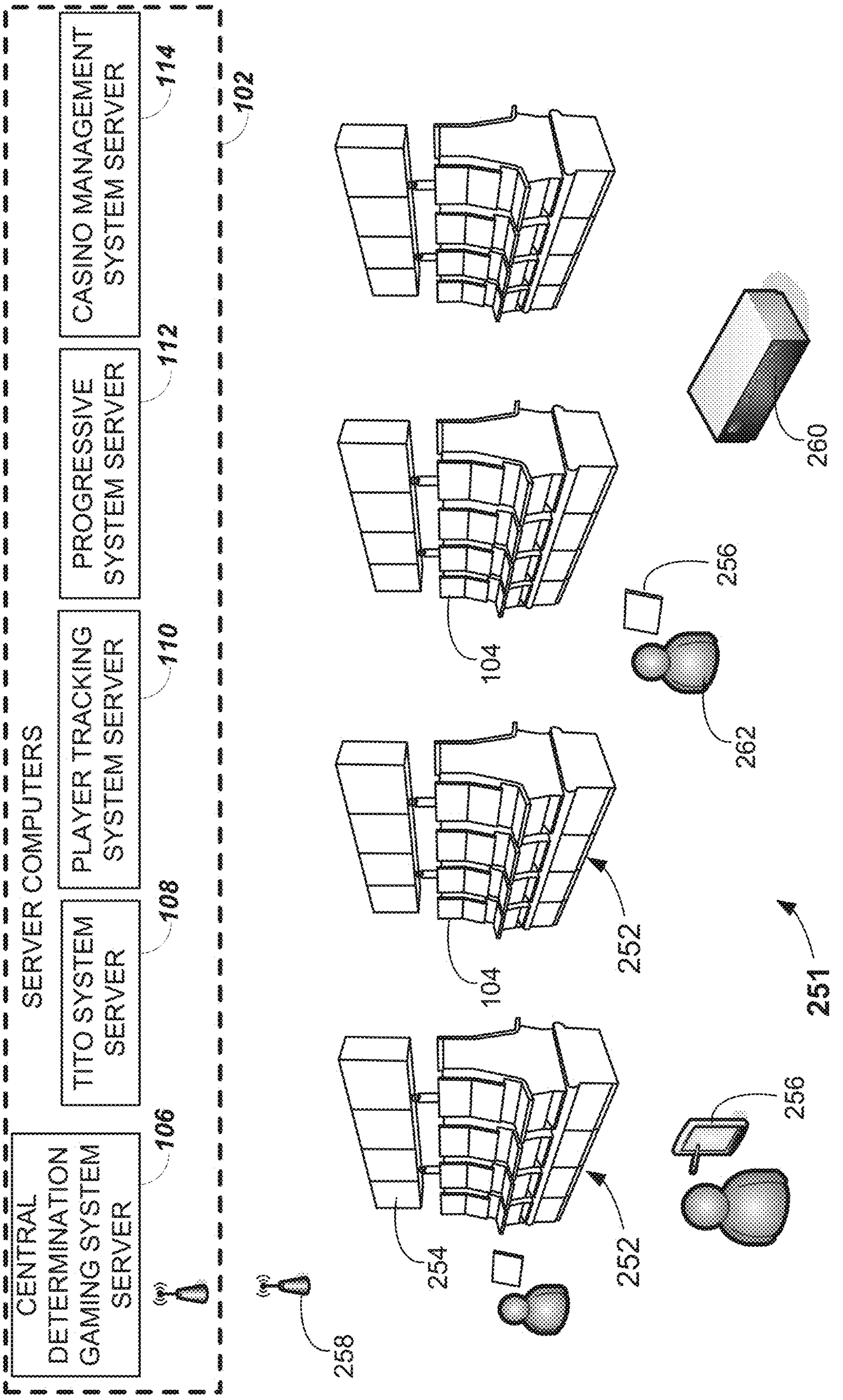
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
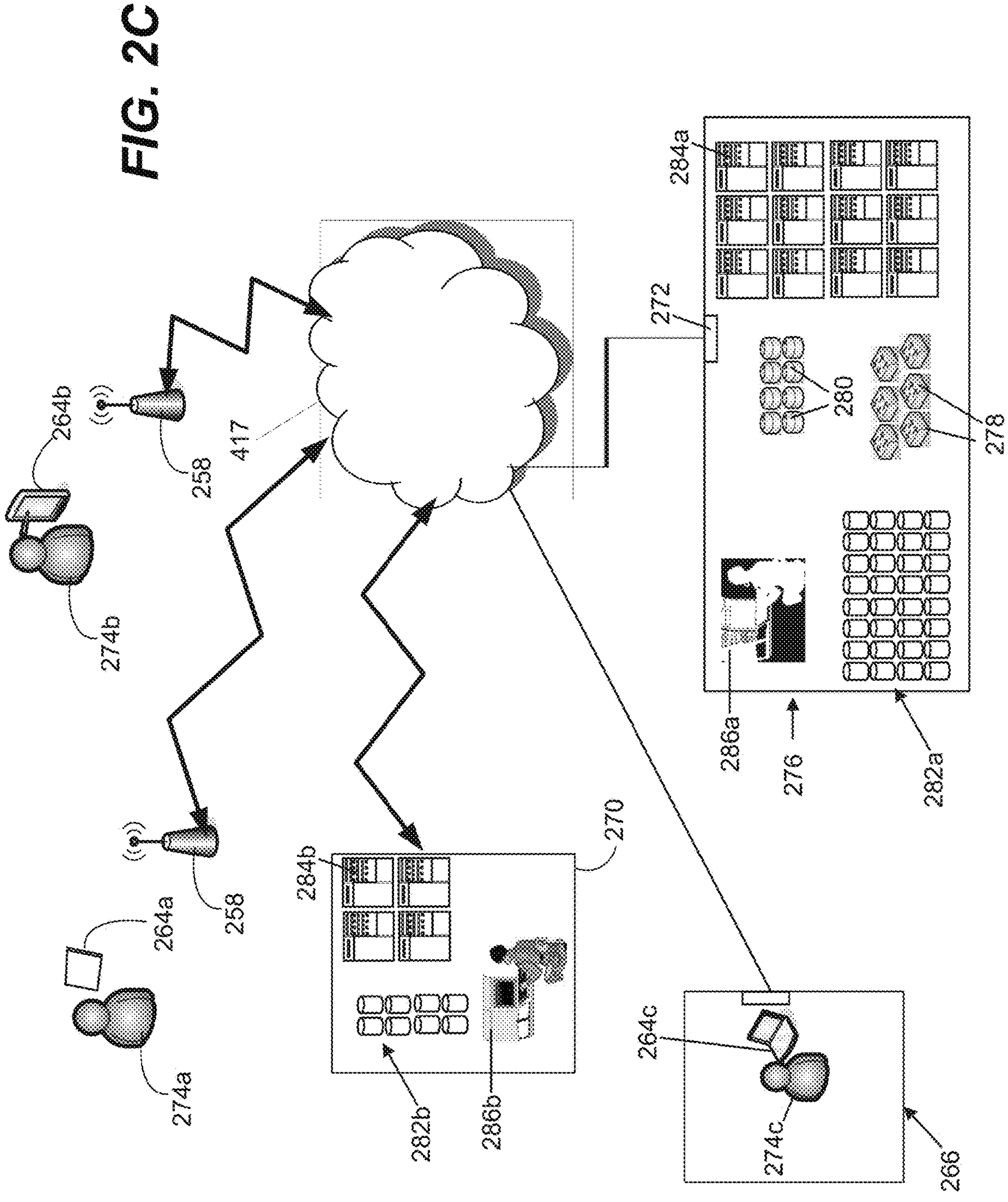
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG.

2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may for example, be capable of applying data filtering algorithms, executing data summary and/or analysis software, etc. In some implementations, data filtering, summary and/or analysis software may be available as "apps" and downloadable by authorized users.

Figure 3:
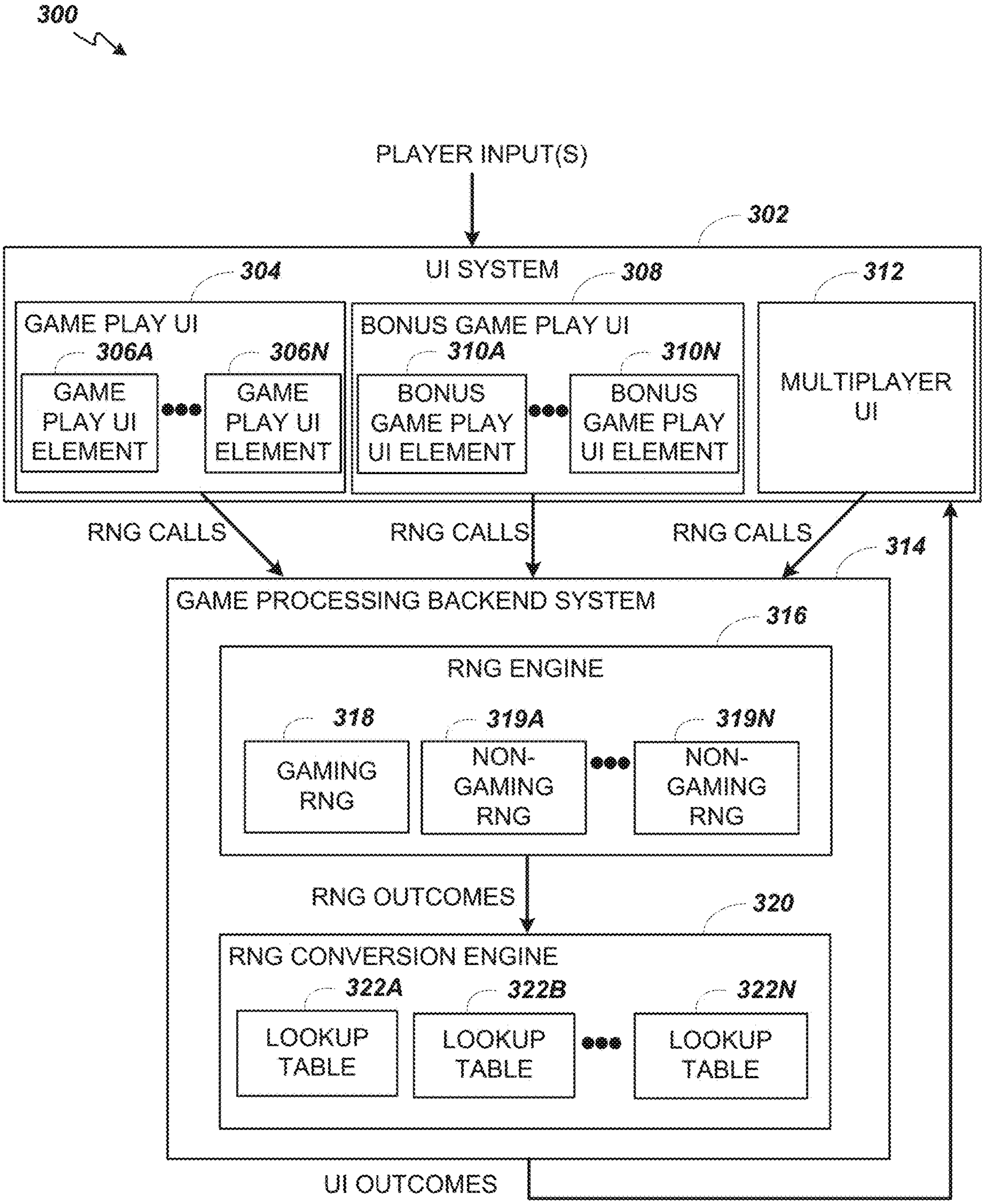
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
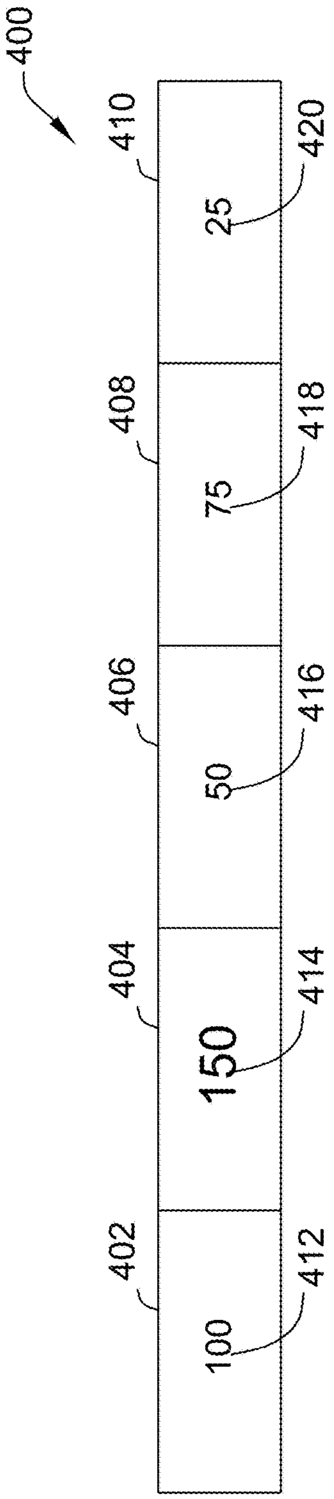
FIG. 4 is an exemplary display area for utilizing historical game data for subsequent gameplay in accordance with the present disclosure.

FIG. 4 is an exemplary display area 400 for utilizing historical game data for subsequent gameplay in accordance with the present disclosure. Display area 400 includes a first display position 402, a second display position 404, a third display position 406, a fourth display position 408, and a fifth display position 410. Each display position 402-410 corresponds to a game outcome 412-420. Game outcomes may correspond to award amounts from the play of a primary game, such as a slot game, video poker game, video bingo game, etc. Any awards from the play of the primary game are stored in a memory location and displayed at display area 400. For example, each respective display position 402-410 may correspond to a data register in memory such that each outcome 412-420 is stored in a respective data register.

In some embodiments, display area 400 may include more or less display positions than shown in display area 400 (e.g., ten, twenty, etc.). Display area 400 may be displayed at, for example, a main display (e.g., main display 128), a secondary display (e.g., secondary display 128*b*), and/or a topper screen (e.g., topper screen 140), as examples. As another example, in some embodiments, display area 400 may be displayed at a mobile gaming device (e.g., mobile gaming device 256). Game outcomes 412-420 may be associated with game outcomes from an electronic game played in a first display area such primary game display 240, while game outcomes 412-420 are displayed in a second display area (e.g., display area 400).

In the example embodiment, display positions 402-410 in display area 400, and the respective data registers corresponding to each of display positions 402-410, each include a recent win outcome 412-420 from an electronic game (e.g., at a gaming device 104A-104X). For example, display positions 402-410 each display a credit amount corresponding to a recent win outcome of an electronic game. In some embodiments, non-winning outcomes (e.g., 0 credits) may also be displayed in display area 400. In some embodiments, only winning outcomes above a certain predetermined threshold (e.g., 100 credits) may be added to display area 400.

In some embodiments, display positions 402-410 may display animations other than win amounts (e.g., certain symbols displayed on reels during an electronic game, what-you-see-is-what-you-get (WYSIWYG) symbols (e.g., cash on reels, wherein each symbol includes display of an outcome amount associated with the respective symbol), etc.). In some embodiments, certain symbols displayed in display positions 402-410 may be associated with combinations of historical and/or currently-displayed credit amounts. For example, certain symbols may be associated with a sum of a plurality of historical credit amounts (e.g., a "repeater" symbol may be associated with a sum of a plurality of historical credit amounts).

While display area 400 is configured in a horizontal orientation, it should be appreciated that embodiments are envisioned wherein display area 400 is configured in orientations different than what is shown in FIG. 4 (e.g., vertical orientations, a wheel orientation (e.g., topper wheel 134), a loop orientation, etc.). Further, while outcomes 412-420 are described herein as being displayed temporally (e.g., a most recent outcome is shown on the far left while the least recent outcome is shown on the far right), outcomes 412-420 may be displayed in any order. For example, in some embodiments outcomes 412-420 may be displayed in order of win/outcome amount (e.g., ascending or descending).

Further, display area 400 may be updated with an entirely new set of game outcomes upon the occurrence of particular detected events (e.g., a detected event may be a change in wager amount presented by a player, and display area 400 may be updated to display game outcomes associated with the new wager amount). For example, a first set of game outcomes may correspond to a first wager amount while a second set of game outcomes may correspond to a second wager amount. In other words, if a player places a $5 wager in one instance, a first set of game outcomes, corresponding to game outcomes from games where a $5 wager was placed, may be displayed at display positions 402-410. If the player then places a $20 wager, each of display positions 402-410 may be updated to display recent game outcomes from games where a $20 wager was placed. Accordingly, the displayed outcomes eligible to be won for a particular game may correspond to an amount wagered (e.g., as a way of controlling RTP).

In some embodiments, game outcomes displayed at display positions 402-410 may correspond to recent game outcomes associated with a player account of a player (e.g., stored at player tracking system server 110). For example, a gaming device may determine the presence of a player associated with a player account, and display game outcomes at display positions 402-410 corresponding to recent game outcomes corresponding to games played by that particular player (e.g., so that the player is more closely tied to the game outcomes eligible to be won as repeated wins). In some embodiments, displayed game outcomes may correspond to game outcomes achieved at an EGM (e.g., gaming devices 104A-104X) and/or game outcomes achieved at other devices such as mobile gaming devices (e.g., mobile gaming device 256). In other words, game outcomes displayed in display area 400 may correspond to both game outcomes achieved in-person at, for example, an EGM at a casino and game outcomes achieved at another location (e.g., on a mobile gaming device). In some embodiments, game outcomes 412-420 may correspond to any event occurring during an electronic game and not the final outcome from the electronic game (e.g., the appearance of a particular symbol during an electronic game may cause a particular amount/object to be displayed as a game outcome 412-420, instead of or in combination with the win amount from that play). In some embodiments, game outcomes may be displayed according to more than one factor (e.g., wager amount and player account, for example).

In the example embodiment, game outcome 414, displayed at display position 404 of display area 400, is animated as being bold to demonstrate that game outcome 414 is the win outcome of greatest value in the plurality of displayed game outcomes 412-420. In some embodiments, more than one game outcome 412-420 may be animated. In some embodiments, the game outcome of greatest value (e.g., game outcome 414) may be animated in a different manner or associated with a different animation than as is shown in FIG. 4 (e.g., surrounded by flashing lights, a colored background, a themed animation, etc.).

In the example embodiment, a server (e.g., servers 106-114) and/or game controller (e.g., game controller 202) tracks recent game outcomes and determines which outcomes 412-420 to display in display area 400 and controls the other steps and/or processes described herein. For example, as shown in FIG. 4, the five most recent winning game outcomes 412-420 are displayed. As described with respect to FIGS. 5A-7, display positions 402-410 are dynamically updated as new game outcomes occur in an electronic game associated with display area 400 (e.g., game outcomes move from left to right as new game outcomes are displayed). Accordingly, in the example shown in FIG. 4, as newer game outcomes are displayed, older game outcomes are no longer displayed (e.g., in some embodiments the old game outcomes are animated to "fall off" the right side of display area 400).

In the example embodiment, each game outcome displayed in display area 400 is eligible to be won in the electronic game associated with display area 400 as a repeated win. For example, each game outcome 412-420 displayed in display area 400 corresponds to a recent game outcome that is eligible to be won in the electronic game as a repeated win. In the example embodiment, upon the occurrence of a trigger event in an electronic game associated with display area 400 (e.g., a particular configuration of symbols being displayed on reels of the electronic game) a game outcome of the plurality of game outcomes 412-420 is presented to the player. In the example embodiment, when the trigger event occurs (e.g., and is detected by a server 106-114 and/or game controller 202), the most valuable game outcome displayed in display area 400 (e.g., game outcome 414) is again presented to the player as a repeated win. Accordingly, the player is excited by the chance at winning the repeated win and is encouraged to do so before the most valuable game outcome (e.g., game outcome 414) "falls off" the list and/or a new most valuable game outcome is displayed in display area 400. In some embodiments, a random game outcome of the plurality of game outcomes 412-420 (e.g., as determined by an RNG call (e.g., to RNG engine 316) and RNG conversion (e.g., by RNG conversion engine 320)) may be presented to the player upon the occurrence of a triggering event. In some embodiments, game outcomes may be provided sequentially, that is first in, first out (FIFO).

In some embodiments, game outcomes fall off after being provided. In some embodiments, game outcomes fall off after an outcome is added, where the oldest outcome falls off. In some embodiments, a new game outcome is only added to one of positions 402-410 if it is greater than a certain threshold (e.g., 100 credits). In some embodiments, a new game outcome is only added to one of positions 402-410 if it is greater than any currently displayed outcome 412-420 (e.g., in the example of FIG. 4, greater than 25 credits). In some embodiments, instead of an oldest game outcome "falling off" of amounts 412-420, a new outcome may replace a lowest outcome 412-420 (e.g., instead of outcome 420 falling off because it is the oldest game outcome, outcome 420 may be replaced by a new outcome because it is the lowest of outcomes 412-420).

In certain embodiments, more than one outcome from display area 400 may be provided as an award for a primary game and/or a bonus game. For example, certain game outcomes (e.g., including display of a particular symbol) may cause a plurality of game outcomes 412-420 to be summed and then presented/awarded. In some embodiments, game outcomes 412-420 may be added to instead of shifted out of positions 402-410 over time. For example, a certain game outcome may cause an outcome amount associated with that certain game outcome to be added to a displayed outcome 412-420, instead of replacing one of outcomes 412-420.

In certain embodiments, outcomes correspond to values displayed by one or more symbols, such as "cash on reel" or WYSIWYG symbols. For example, in a primary game, where a bonus trigger requires a certain quantity of cash on reel symbols to appear on the primary game outcome matrix, when less than that certain quantity of symbols appear, their sum (or highest, or any other measure) may be added as a game outcome to display area 400. Game outcomes may be provided during the play of the bonus game, Game outcomes that are stored and provided may extend session time for a player (e.g., a player may choose to play a few more games to try and win a big game outcome again). Winning an outcome a second time may cause an increase in the RTP of the game as compared to a game that does not provide a game outcome a second time. In order to ensure that the RTP does not exceed a certain maximum, various other aspects are used to control RTP. Such aspects include controlling the probability of a trigger in the primary game or bonus game that provides the stored/repeated outcomes. Further, the increase in RTP from providing stored outcomes may be balanced with reducing the RTP of the primary game and/or the bonus game. Further, the paytable of the game may be modified in a certain way that provides for frequent small wins and infrequent larger wins. A higher frequency of smaller wins may cause a larger game outcome to fall off the queue more quickly.

In some embodiments, a gaming device executing a repeated win game, as described herein, may be a standalone repeated win (e.g., win-it-again) system that contributes previous game outcomes to a queue (e.g., positions 402-410), and awards repeated wins from the queue, that are associated with a single gaming device (e.g., an EGM, a mobile gaming device, etc.). Further, a system executing a repeated win game may track potential repeated wins associated with, and provide repeated wins associated with, one or more of a local-area network of gaming devices and a wide-area system including a wide-area network of gaming devices.

Further, in some embodiments, one or more progressive awards may be associated with the "queue" of repeated wins wherein the one or more progressive awards may be paid from an escrow account. The escrow account may be funded with contributions (e.g., increments/payments) made to the escrow account that are a percentage of each wager/bet/input placed by the player(s) (e.g., similar to parimutuel betting). The one or more repeated win values may be sorted in value with the one or more progressive award on the queue, or may occupy the first or last (or any other) positions on the queue. As an example, for a five-position queue, one of the positions may be a progressive award which is not replaced by repeated awards. Further, depending on the value of the progressive and repeated awards on the queue, the progressive award may not be the prize of greatest value on the queue.

Figure 5A:
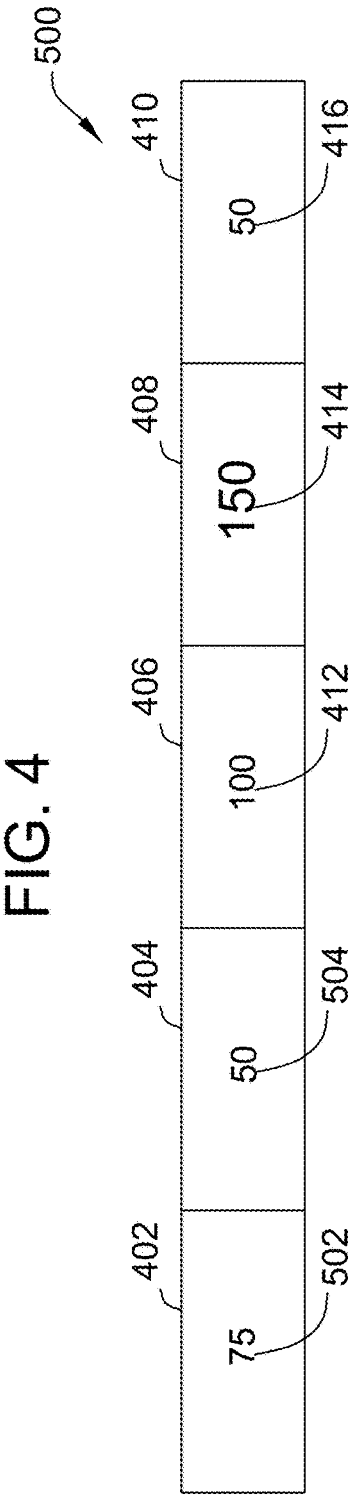
FIG. 5A is another exemplary display area for utilizing historical game data for subsequent gameplay in accordance with the present disclosure.

FIG. 5A is a further exemplary display area 500 for utilizing historical game data for subsequent gameplay in a sequence starting from FIG. 4. Display area 500 includes display positions 402-410 each displaying a recent game outcome. Displayed game outcomes include outcomes 412, 414, and 416 from display area 400, while game outcomes 418 and 420 have "fallen off" and been replaced by game outcomes 502 and 504. Game outcome 414 remains the most valuable displayed outcome, and therefore is still displayed in bold in FIG. 5A.

Figure 5B:
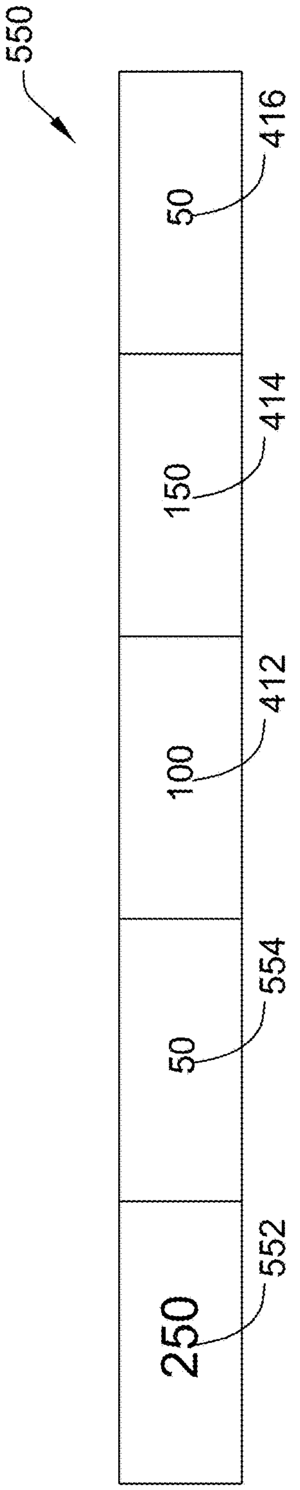
FIG. 5B is another exemplary display area for utilizing historical game data for subsequent gameplay in accordance with the present disclosure.

FIG. 5B is an alternative exemplary display area 550 for utilizing historical game data for subsequent gameplay in a sequence starting from FIG. 4. Display area 550 includes display positions 402-410 including alternative game outcomes from what is shown in FIG. 5A. Displayed game outcomes include outcomes 412, 414, and 416 from display area 400, while game outcomes 418 and 420 have "fallen off" and been replaced by game outcomes 552 and 554. However, newly displayed game outcomes 552 and 554 include game outcome 552 representing a new most valuable displayed outcome. Accordingly, game outcome 414 is no longer displayed as bold, and game outcome 552 is displayed as bold.

Figure 6:
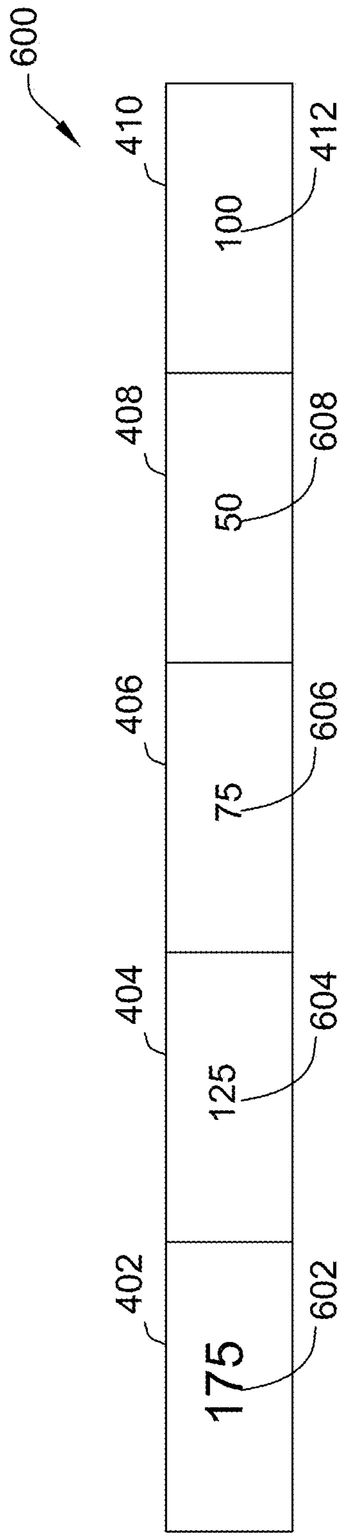
FIG. 6 is another exemplary display area for utilizing historical game data for subsequent gameplay in accordance with the present disclosure.

FIG. 6 is a further exemplary display area 600 for utilizing historical game data for subsequent gameplay in sequence from FIG. 4 and FIG. 5A. Display area 600 includes display positions 402-410 each displaying a recent game outcome. Displayed game outcomes include outcome 412, now displayed at display position 410, with new game outcomes 602-608 (e.g., game outcomes 414-420 have fallen off and are no longer displayed). Game outcome 602 represents the most valuable displayed game outcome, and accordingly is displayed as being bold to attract player attention.

Figure 7:
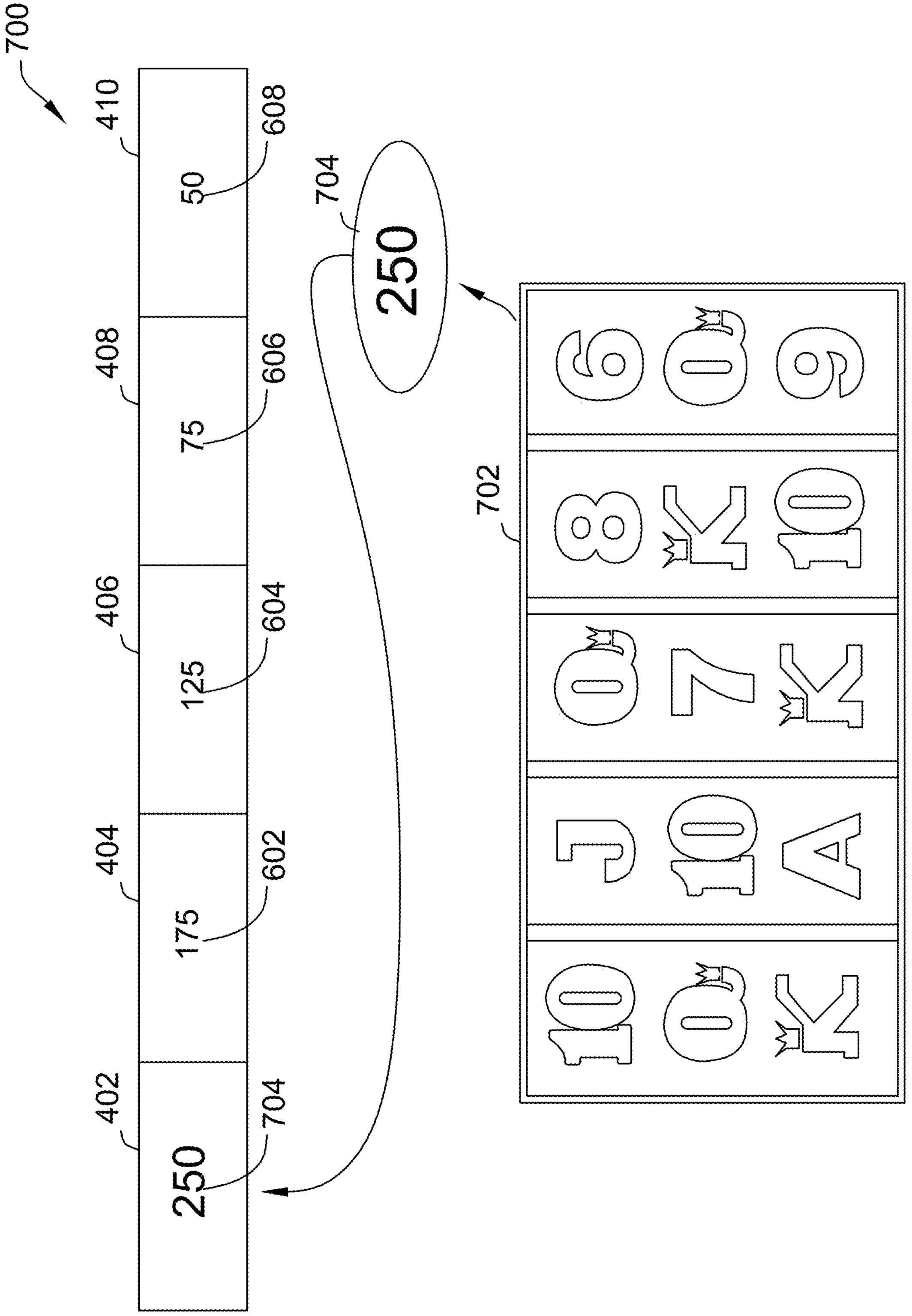
FIG. 7 includes exemplary display areas for utilizing historical game data for subsequent gameplay in accordance with the present disclosure.

FIG. 7 includes exemplary display areas 700, 702 for utilizing historical game data for subsequent gameplay in accordance with the present disclosure. In the example embodiment, display area 700 may be displayed on a secondary display (e.g., secondary display 128*b*) while display area 702 may be displayed on a main display (e.g., main display 128). Accordingly, a reel game (e.g., or any other electronic game as described herein) may be displayed in display area 702, wherein the reel game results an outcome amount 704. Outcome amount 704 is then added to display position 402 of display area 700, while a previously displayed outcome amount (e.g., outcome amount 412) falls off the right side of display area 700. Outcome amount 704 is now the most valuable outcome amount displayed in display area 700, and is animated (e.g., made bold) accordingly.

Figure 8:
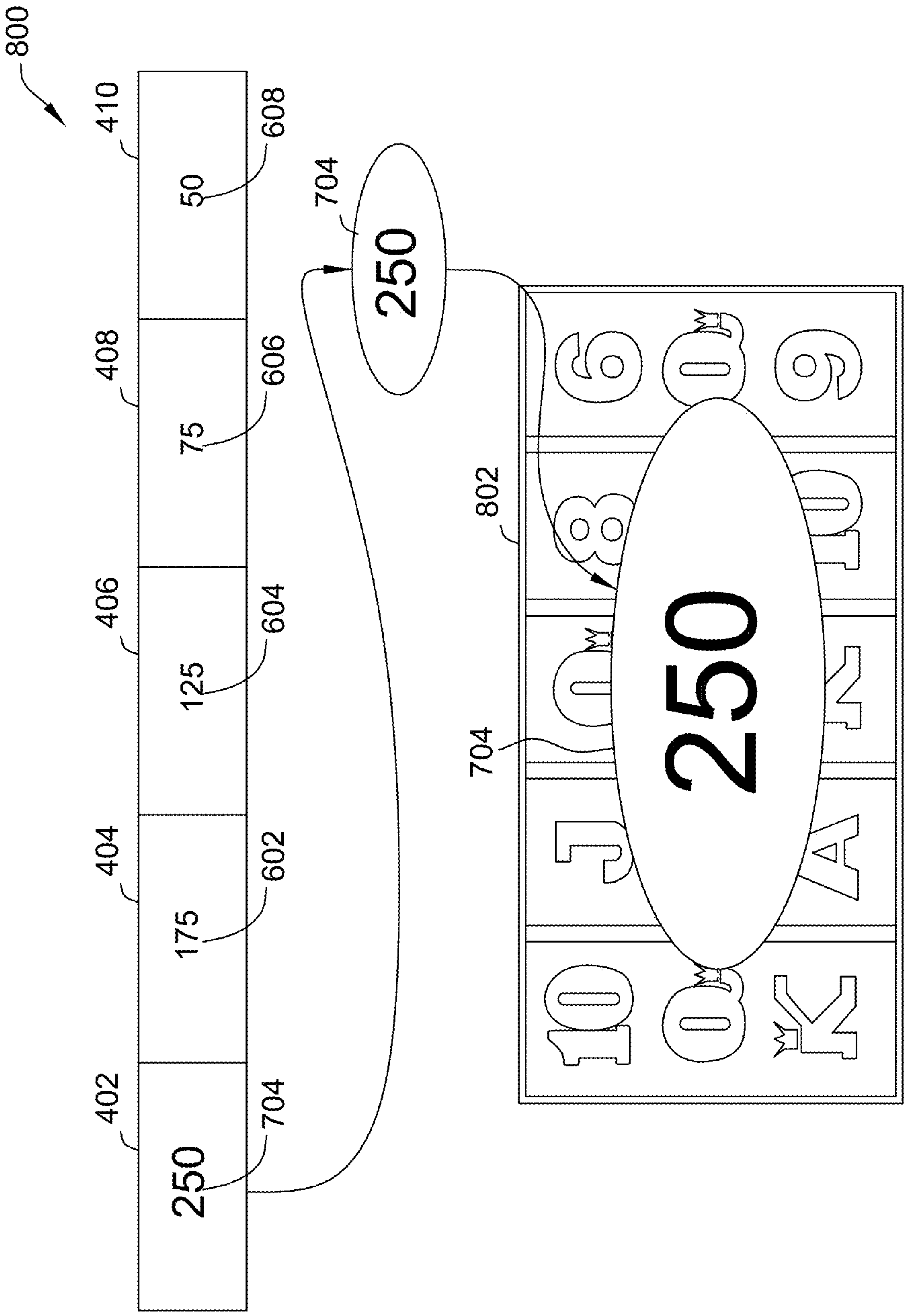
FIG. 8 includes exemplary display areas for utilizing historical game data for subsequent gameplay in accordance with the present disclosure.

FIG. 8 includes exemplary display areas 800, 802 for utilizing historical game data for subsequent gameplay in accordance with the present disclosure. In the example embodiment, display area 800 may be displayed on a secondary display (e.g., secondary display 128*b*) while display area 802 may be displayed on a main display (e.g., main display 128). Accordingly, a reel game (e.g., or any other electronic game as described herein) may be displayed in display area 802, wherein the reel game results in an outcome that triggers the most valuable outcome amount displayed in display area 800 (or any individual and/or combination of outcome amounts displayed in display area 800) to be presented. Accordingly, outcome amount 704 is displayed in display area 802 as a repeated outcome amount to be presented to a player and/or player account.

Figure 9:
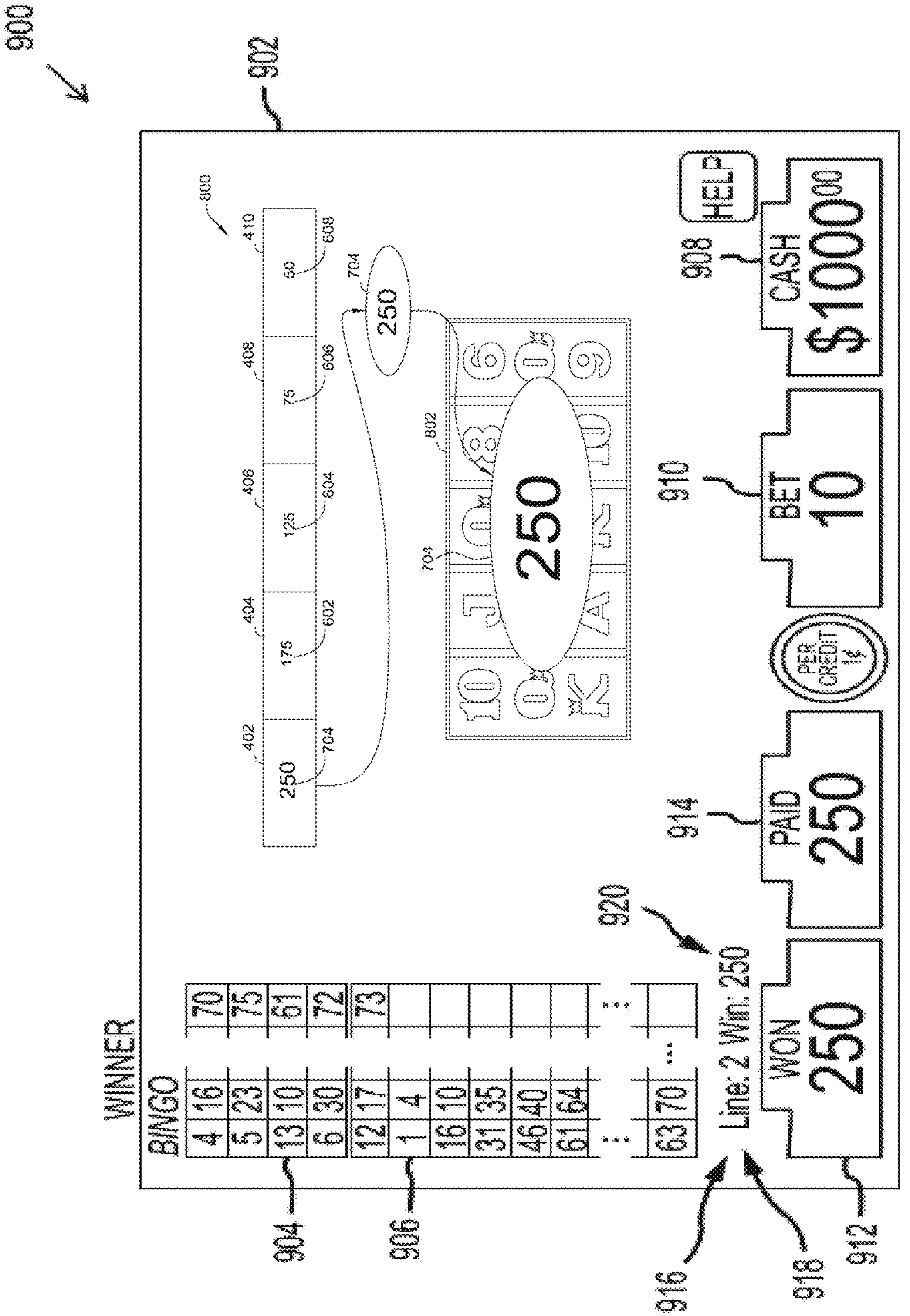
FIG. 9 illustrates an example Class II bingo game utilizing historical game data for subsequent gameplay in accordance with the present disclosure.

FIG. 9 illustrates a screenshot 900 of an example Class II bingo game utilizing historical game data for subsequent gameplay in accordance with the present disclosure. Certain aspects, as described with respect to FIG. 9, may also be utilized in Class III games and/or other types of electronic games.

For example, as shown in FIG. 9, a bingo card 904 and a bingo number listing 906 are displayed. As shown, bingo card 904 includes a matrix of bingo cells (e.g., squares). In some examples, the matrix may be a 5×5 matrix of 25 total cells. In some examples, bingo card 904 may have a matrix of a different size (e.g., 3×3, 4×4, 4×5, 4×6, 6×6, 7×7, 3×8, 10×10, etc.). In some examples, the matrix may be larger or smaller. In the example of FIG. 9, each cell in the matrix of the bingo card 904 includes a number that is not repeated in any other cell of the bingo card 904.

In the example of FIG. 9, screenshot 900 further includes a credit meter 908 showing an amount of money and/or credits (e.g., credit balance) held by a player of the gaming device. In the example of FIG. 9, a credit meter 908 shows $1000. Screenshot 900 additionally shows a wager meter 910 adjacent to credit meter 908, under "BET." In the example of FIG. 9, the amount wagered is 10 credits (e.g., $0.10). The amount wagered (e.g., via a user interface) may be deducted from credit meter 908. Screenshot 900 additionally includes a win meter 912 and a total win meter 914. In the example of FIG. 9, win meter 912 is 250 and total win meter 914 is 250 to indicate that 250 credits have been won and awarded/outputted. Further, a reel win information display area 916 includes win line information 918 and award information 920. Win line information 918 indicates which payline in the reels includes symbols corresponding to a win/outcome amount. Award information 920 indicates an associated award amount for the winning reel game outcome.

Central determination gaming system server 106 may manage (and/or host) the bingo game, such as by generating the bingo card 904 (or cards, as above) and/or bingo number listing 906. In some examples, the bingo card 904 (and/or information on which the bingo card 904 is based), and/or the bingo number listing 906 may be generated using an RNG. In some examples, the bingo card 904 may be randomly selected from a set of bingo cards or a player may select their own bingo card 904 (e.g., via the user interface), such as from a set of randomly generated bingo cards, for example.

In operation, a player and/or gaming device may be provided with a respective bingo card 904, such as by central determination gaming system server 106. For example, a player may be provided a new bingo card 904 each time a "Spin" or "Play" button is pressed by the player (e.g., via a user interface), provided the player has made a wager/input. In some examples, more than one bingo card 904 may be generated in response to a wager. The bingo number listing 906 (e.g., "ball call") may be randomly generated, such as by central determination gaming system server 106. Bingo card 904 may be compared to bingo number listing 906, and numbered cells on bingo card 904 that match numbers in the bingo number listing 906 may be marked or "daubed" on bingo card 904. Finally, the marked or daubed bingo card 904 may be evaluated against a paytable of winning bingo patterns.

Bingo number listing 906 may be continually generated until a maximum amount of numbers are listed (e.g., seventy-five numbers listed) or until a game-ending pattern is awarded to a player participating in the bingo game. A typical game-ending pattern may be a bingo card blackout pattern, in which each of the numbers of a bingo card match a number displayed in bingo number listing 906. Other game-ending patterns are also possible. When the game-ending pattern is awarded, bingo number listing 906 is reset, for all players participating in the bingo game and the process repeats. In some examples, a single play of the bingo game includes a wager, a bingo card 904, a bingo number listing 906, a matching of the numbers called with those on a bingo card 904, a determination of a bingo game outcome, and a presentation of an associated award, if any.

A bingo game outcome may be determined by comparing one or more patterns of marked (and/or "daubed) cells of the bingo card 904 with a paytable of winning bingo patterns. If bingo card 904 does not include a pattern that matches a pattern in the paytable of winning patterns, then a losing bingo outcome is determined, and no award may be provided to the player. If bingo card 904 does include a pattern that matches a pattern in the paytable of winning patterns, then a winning bingo outcome is determined, and a reward may be provided to the player.

Different winning patterns may be associated with different awards. The award for a winning main bingo game outcome may be based on an amount wagered, an associated main bingo game paytable, an associated set of rules for the main bingo game, a probability (and/or likelihood) of achieving a particular bingo pattern/combination, an amount of bingo numbers needed to achieve the particular bingo pattern/combination, and/or other considerations. In some examples, the player/player account may be awarded for multiple patterns (e.g., all winning patterns) that are matched when bingo card 904 is evaluated against the paytable of winning patterns. In some examples, the player may be awarded for only the highest priority pattern (e.g., the highest paying winning pattern) that is matched. In some examples, during play of a Class II game, a player is provided or selects a single bingo card 904 for multiple plays of the bingo game, with a new bingo number listing 906 generated for each play of the bingo game. Other methods of play of a Class II bingo game are also envisioned and are within the scope of this disclosure.

The bingo game outcome may be presented to the player via a spinning reel game simulation. In the example of FIG. 9, the spinning reel game is simulated via the plurality of reels in area 802. For each play of the bingo game, the bingo game outcome is presented at least in part as a reel spin outcome in the reel game. In some examples, the spinning reel game simulation may operate by spinning each reel and then stopping each reel in a particular position to obtain a matrix of symbols. One or more combinations of symbols in the matrix of symbols may be associated with a reel game outcome that is equal to at least a portion of the main bingo game outcome. For example, a winning bingo game outcome may be displayed as a winning combination of reels. Similarly, a losing bingo game outcome may be displayed as a losing combination of reels. Different outcomes of the bingo game may be displayed as different outcomes in the spinning reel game. Thus, the bingo game outcome is presented to the player at least in part as a particular reel spin outcome of reels.

In the example embodiment, flags for each available repeat win value (e.g., 602-608 and/or 704) may be associated with one or more corresponding bingo paytable patterns. Accordingly, if a flagged pattern is hit on a bingo card 904, the corresponding persistent award (e.g., 602-608 and/or 704) is presented, along with any main game credit award (e.g., zero or more credits).

For example, a flag for each of outcomes 602-608, 704 and/or positions 402-410 may be associated with one or more bingo paytable patterns and stored in one or more paytables of bingo patterns. In some embodiments, the one or more paytables may be dynamically updated when any of positions 402-410 are updated with new outcomes. If a bingo pattern is hit/achieved that includes a flag, the outcome 602-608, 704 corresponding to the flag would be awarded, in addition to the normal pattern win (e.g., greater than or equal to zero credits).

In some embodiments, more than one flag may be associated with one or more patterns. For example, if two flags corresponding to position 406 and one flag corresponding to position 408 are included in an achieved bingo pattern, two of outcomes 604 and one of outcome 606 may be presented (e.g., 125×2+75=325 credits total).

Further, as explained herein, a special indication may be displayed so that the player can tell that they are winning a special repeat value based on their previous historical data (e.g., as shown in FIG. 8). As explained elsewhere herein, in some embodiments, only outcome amounts over a predefined threshold may be added to positions 402-410 (e.g., and corresponding paytables, data registers, etc.). For example, only outcomes over a predefined multiple of a bet level may be added to positions 402-410 (e.g., over one times a bet, or over two times a bet, or over 10 times a bet).

In some embodiments, as described herein, a hold-n-spin/cash on reels feature game may be provided. Accordingly, when a repeat win outcome is to be presented, the repeat win outcome may be displayed as a hold-n-spin symbol in the feature game. For example, during play of the feature game, gold coins may be displayed (e.g., each including display of an outcome amount thereon). One example coin may be associated with one or more historical win values. Further, a coin associated with one or more historical win values may be displayed differently than other coins (e.g., a different color, pattern, animation etc.) to indicate that it is associated with one or more historical win values. In some embodiments, the coin associated with one or more historical win values may also include display of the one or more historical win values thereon.

Further, as explained herein, persistent outcomes may be tracked on a per device basis rather than a per player basis. Accordingly, as an example, the last five "big" wins on a machine are displayed at positions 402-410. The displayed historical outcomes may also be denom (e.g., denomination designating how much a credit is worth) and/or bet multiplier dependent (e.g., if a player switches from 2× to 3× their bet, or changes their bet from 1 cent to 2 cents, the displayed historical outcomes may change to correspond to historical outcomes associated with the same denom and/or bet multiplier—as stored in the data registers described herein).

Further, certain input/wager changes (e.g., betting at one penny and then boosting up to Max bet) may create a potential increase in RTP. For example, a player may play at a high wager amount and then switch to one cent wagers when a high value win is available to be repeated (e.g., a 20,000 credit value equal to $200). This may be addressed by controlling/configuring the probability to hit a repeated win at a greater and/or lower wager.

In other words, there is potential abuse on increasing the RTP if there is a very large value available as a repeated award from play at a high wager, and the player transitions to play at a low wager to try to win the large value, while playing at the lower wager. This may be addressed by dynamically (e.g., according to wager level) adjusting the odds of hitting a repeat/historical win according to a player input/bet multiplier/wager (e.g., different odds of winning a repeated win may be associated with different wager amounts). So then, if a player wants to win a large repeated win, they may need to play at a higher bet multiplier to get those higher historical win values into the queue (e.g., available outcomes at positions 402-410). For example, when a player switches down to a lower bet multiplier to try and hit the higher win values, lower historical awards are then dynamically placed on the repeater queue (e.g., positions 402-410) as the player plays at the lower wager amount, and those lower historical awards are likely to push off the higher award value before a repeated historical award is presented.

As a specific example, a player betting $10.00 per spin cannot achieve a giant win (e.g., $900) and then drop to betting $0.50 per spin in the hopes of repeating the $900 win for a much lower bet (e.g., because the repeat win values would change to repeat win values associated with the new bet amount of $0.50 per spin and/or the $900 win would be "pushed off" the queue by lower win amounts associated with the lower bet).

In a Class III example, an RNG call/output may correspond to one of the available historical awards. In Class II the historical award may be whichever of the patterns (with award flag) is achieved, as described above. For example, if a pattern with flag 3 (e.g., corresponding to position 406) is achieved, repeat/historical win 3 (e.g., outcome 604) would be presented.

In some embodiments, a repeat win plus a base award becomes a next award added to the queue of historical outcomes (e.g., 402-410). In some embodiments, only base wins are added to the queue. The base win values that are eligible to be added to the queue might be limited to those above a minimum value (e.g., 100 credits) or within a range of values (e.g., 100 to 1000 credits). If an awarded repeat outcome is presented and is not replaced by the awarded repeat+base win, then the corresponding display position (e.g., 402-410) may be left vacant, or it can be reseeded with a predetermined 'reset' award (e.g., a minimum eligible value), or a randomly chosen value from within a range of values may be provided. In some embodiments, an awarded repeat value may remain in the queue, such that it can potentially be re-awarded more than once. In some embodiments, when a repeat value is awarded, no new award is added to the queue (e.g., the "queue" remains unchanged).

In one example, the likelihood of winning a repeat award may be 0.826% (e.g., 1/121). Then, in 1/50 games, an outcome may be won corresponding to a value large enough to add to the queue (e.g., to move the queue). In ~250 games, on average, repeat awards would have scrolled off the entire queue (e.g., 402-410). According to these odds, a player would likely have hit a repeat win at least twice before all outcomes are replaced (e.g., presenting at least two repeat wins before a value/values scroll off the queue provides better gameplay quality).

In other words, how often a new value gets added to the queue may depend upon the rule for adding to a new value to the queue. For example, assume the queue only tracks winning outcomes—then only winning spins get appended to the queue. Further, suppose the game has a hit frequency such that ⅓ of all spins are non-zero. Thus, a new value joins the queue and an old value drops off every 3 spins on average. If the "waterfall" queue is 20 positions long, (e.g., displays the last twenty winning spin amounts in chronological order), and the desire is to see this entire display cycle twice before triggering the repeated win event (e.g., a repeated win being awarded), then the repeated win trigger may be set to occur every 120 spins on average. The RTP of this feature may be determined by repeatedly sampling twenty winning spins and recording the highest value in each sample of twenty. Then, the average of the highest value in each sample may be taken. This is the expected win amount of the repeated win feature. In a further example, suppose that that highest value win in twenty winning spins averages 12 times the wager. Then the repeated win feature in this example adds 12/120 to the RTP of the game or adds 10% toward the RTP for the game.

Having a randomly or specifically chosen repeat win from among the available repeat wins will skew RTP slightly. However, RTP can be calculated by taking the average of all the wins available that could become repeat wins and applying that to an estimated RTP of the repeat win value. This method provides a good indicator of the overall win value of the repeat wins over the lifetime of the game. In other words, in instances where a repeat value is high/low, a weighted table may be provided/generated that will skew the general RTP of the repeat win. For example, the likelihood/percentage of each pattern that meets or exceeds a predetermined threshold value for being added to the queue, multiplied by the percentage chance of those events occurring, causes an award added to queue event. Thus, it is determined how frequently a repeat award of a particular value would be awarded, with a decent amount of confidence (e.g., to facilitate configuring the game to control RTP).

In some embodiments, the repeat values are sorted in ascending order with the probability of hitting an award decreasing as the awards get larger (e.g., the probability of hitting the pattern with flag 5 (e.g., associated with 410) is lowest, flag 1 (e.g., associated with 402) is highest). As an example, on average, 1 in every 20 games may provide a value that is above the minimum amount to get added to the queue, and, on average, in 1 of 121 games a player may randomly win one of the five values (e.g., shown at 402-410), with the occurrence of hitting a pattern awarding a lower value award (e.g., flag 1) happening more frequently than the occurrence of hitting a pattern awarding a higher value award (e.g., flag 5).

In some embodiments, the queue may be configured such that that highest or lowest values fall off the queue when a new value is added (e.g., instead of the "oldest" value being replaced). In some embodiments, the repeated wins available on the queue may be assigned probabilities of being awarded based upon their value. In some embodiments, the values may be sorted such that the highest value is always the next to be pushed off of the queue by the next value added to the queue (e.g., unless the next value to be added is a new highest value, then the new highest value would replace the current highest value in that position, e.g., push it off of the queue). Depending on game design, lower to mid-range values may land and be added to the queue more frequently, pushing the highest values over the edge/off the queue (e.g., after one or two replacement cycles, assuming the higher values were of sufficient amount to earn them highest or 2nd highest position). Further, excitement to the player may be increased because of a desire to trigger the upper tier/highest value repeated award before landing another lower-value win.

In the example embodiments, outcomes 704, 602-608 move across positions 402-410 as they are replaced, as described herein. In some embodiments, upon a repeat win trigger, a random outcome of the outcomes displayed at positions 402-410 may be provided. In some embodiments, the highest value outcome displayed at positions 402-410 may be provided.

In some embodiments, outcomes 704, 602-608 may be outcomes corresponding to personal player account data (e.g., historical outcomes for that specific player, as described herein—e.g., across mobile environments, land-based environments, etc.). Accordingly, players are able to repeat wins that they and/or their player account personally won.

In an example embodiment, a repeat/historical win may be awarded with the award being randomly chosen from the repeat win queue (e.g., values in positions 402-410). Only base game wins above a minimum predetermined threshold are added to the repeat win queue, with each newly-added outcome replacing the oldest outcome from the queue when a new one is added (e.g., FIFO, as described herein). In some embodiments, available repeat/historical win values may be based upon player account historical data (e.g., where, when a player accesses their player account on a gaming device, positions 402-410 are filled in with historical outcomes/win values associated with their player account).

Figure 10:
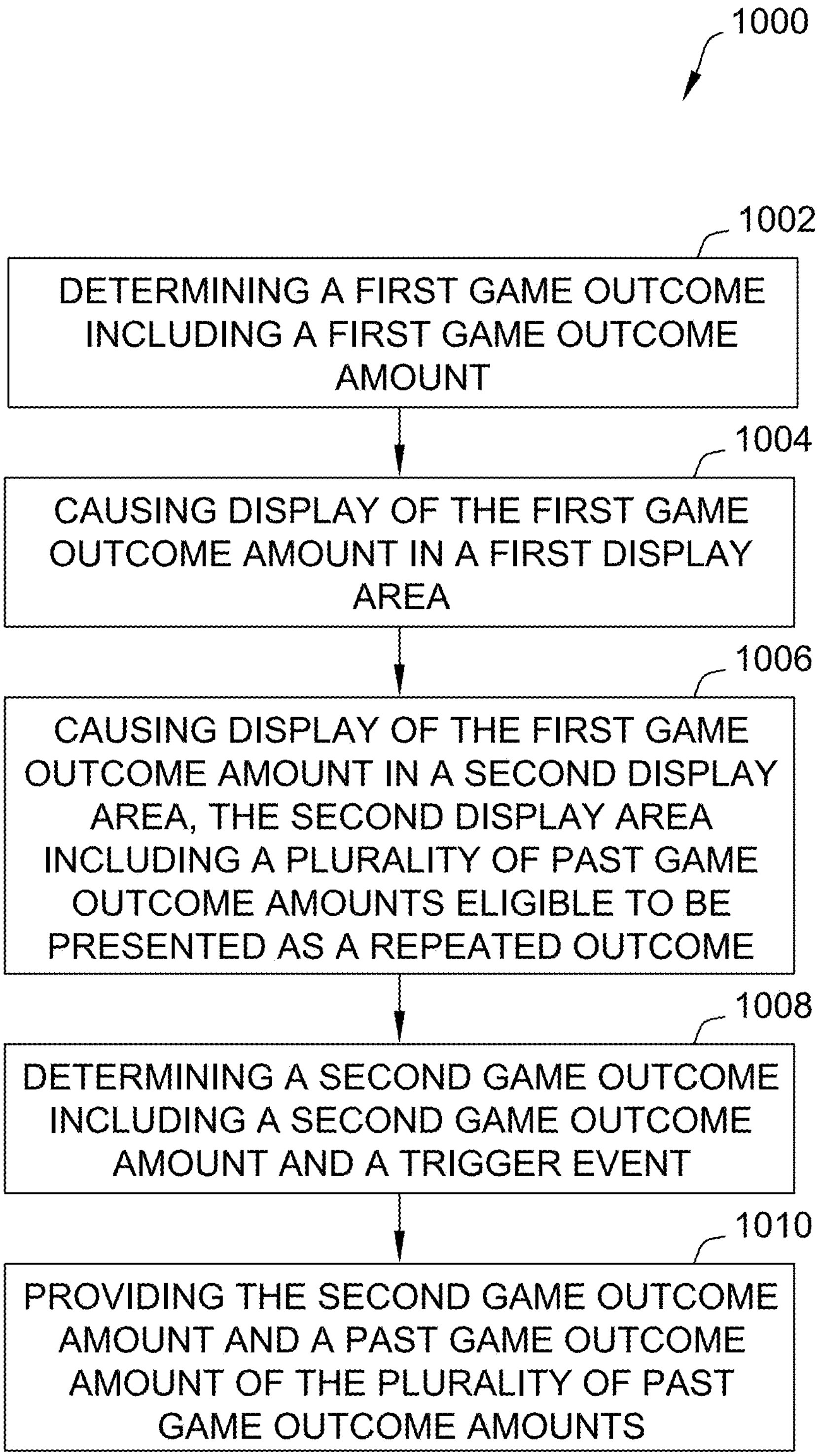
FIG. 10 illustrates an exemplary method of utilizing historical game data for subsequent gameplay in accordance with the present disclosure.

FIG. 10 illustrates an exemplary method 1000 of utilizing historical game data for subsequent gameplay in accordance with the present disclosure. In the example embodiment, method 1000 includes determining 1002 a first game outcome including a first game outcome amount, causing display 1004 of the first game outcome amount in a first display area, and causing display 1006 of the first game outcome amount in a second display area (e.g., in response to the first game outcome amount being added to a data register of a plurality of data registers), the second display area including a plurality of past game outcome amounts stored in the plurality of data registers and including the first game outcome amount, wherein each past game outcome amount of the plurality of past game outcome amounts displayed in the second display area is stored in a respective data register of the plurality of data registers and is eligible to be presented as a repeated outcome by the at least one processor. Method 1000 further includes determining 1008 a second game outcome, wherein the second game outcome includes a second game outcome amount and a trigger event corresponding to the plurality of past game outcomes displayed in the second display area, and providing 1010 the second game outcome amount and, based upon the second game outcome including the trigger event, a past game outcome amount of the plurality of past game outcome amounts.

In some embodiments, method 1000 includes storing a plurality of flags in a paytable associated with game outcomes, wherein each flag of the plurality of flags is associated with at least one past game amount of the plurality of past game outcome amounts. In some embodiments, method 1000 includes determining that the second game outcome includes a flag of the plurality of flags and providing the past game outcome amount of the plurality of past game outcome amounts wherein the past game outcome amount is associated with the flag of the plurality of flags.

In some embodiments, method 1000 includes causing display of an indicator proximate to a highest past game outcome amount of the plurality of past game outcome amounts in the second display area. In some embodiments, method 1000 includes storing each of the plurality of past game outcome amounts in a respective data register of a plurality of data registers, wherein each data register of the plurality of data registers corresponds to a respective display position in the second display area.

In some embodiments, method 1000 includes in response to determining the second game outcome amount including the trigger event, searching the plurality of data registers for a highest past game outcome amount stored in the plurality of data registers and providing the past game outcome amount of the plurality of past game outcome amounts, wherein the past game outcome amount includes the highest past game outcome amount stored in the plurality of data registers.

In some embodiments, method 1000 includes determining a random past game output amount of the plurality of past game output amounts based upon an output from a random number generator (RNG) and providing the past game outcome amount of the plurality of past game outcome amounts, wherein the past game outcome amount includes the random past game outcome amount stored in the plurality of data registers.

It should be appreciated that a variety of embodiments are envisioned regarding providing repeated/repeatable wins in accordance with the present disclosure. For example, in some embodiments symbols from reels in an electronic game may be displayed in a display area instead of game outcomes. In some embodiments, symbols appearing in a display area may be used in an electronic game (e.g., being played in the same display area or a different area). In other words, any historical data (e.g., game data from previously played electronic games) may be utilized according to the systems and methods described herein. Accordingly, a variety of communications between and control of the example display areas and a display area displaying gameplay are envisioned (e.g., symbols and/or other game aspects may be moved between display areas in accordance with a particular electronic game being played).

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic gaming device comprising:

at least one memory with instructions stored thereon; and at least one processor in communication with the at least one memory, wherein the instructions, when executed by the at least one processor, cause the at least one processor to:

cause display of a first plurality of past game outcome amounts associated with a first input amount for an electronic game, wherein one or more of the first plurality of past game outcome amounts are eligible to be presented as a repeated outcome in at least one future play of the electronic game at the first input amount;

determine a first game outcome associated with a first game outcome amount for a first play of the electronic game at the first input amount;

cause display of the first game outcome amount to be added to the first plurality of past game outcome amounts;

receive an input of a second input amount for a second play of the electronic game; and in response to receiving the input of the second input amount, cause display of the first plurality of past game outcome amounts to be replaced with display of a second plurality of past game outcome amounts associated with the second input amount for the electronic game, wherein one or more of the second plurality of past game outcome amounts are eligible to be presented as a repeated outcome in at least one future play of the electronic game at the second input amount.

2. The electronic gaming device of claim 1, wherein the instructions further cause the at least one processor to cause display of the first game outcome in a first display area and cause display of the first plurality of past game outcome amounts in a second display area.

3. The electronic gaming device of claim 2, wherein the instructions further cause the at least one processor to cause display of at least one outcome amount of the first plurality of past game outcome amounts to be removed from the first display area when display of the first game outcome amount is added to the first plurality of past game outcome amounts in the first display area.

4. The electronic gaming device of claim 3, wherein the at least one outcome amount comprises an oldest outcome amount of the first plurality of past game outcome amounts.

5. The electronic gaming device of claim 1, wherein the instructions further cause the at least one processor to cause display of the first plurality of past game outcome amounts in response to receiving an input of the first input amount for the first play of the electronic game.

6. The electronic gaming device of claim 1, wherein the instructions further cause the at least one processor to cause display of the first plurality of past game outcome amounts based upon the first plurality of past game outcome amounts being stored in a first plurality of data registers associated with the first input amount.

7. The electronic gaming device of claim 6, wherein the instructions further cause the at least one processor to cause display of the second plurality of past game outcome amounts based upon the second plurality of past game outcome amounts being stored in a second plurality of data registers associated with the second input amount.

8. The electronic gaming device of claim 7, wherein one or more of the first plurality of data registers or the second plurality of data registers are stored in the at least one memory or at least one server in communication with the electronic gaming device.

9. The electronic gaming device of claim 1, wherein the instructions further cause the at least one processor to determine the first game outcome based upon at least one message received from at least one server, wherein the at least one message is associated with the first game outcome amount.

10. An electronic gaming system comprising:

at least one memory with instructions stored thereon; and at least one processor in communication with the at least one memory, wherein the instructions, when executed by the at least one processor, cause the at least one processor to:

cause a first plurality of past game outcome amounts associated with a first input amount for an electronic game to be displayed at an electronic gaming device, wherein one or more of the first plurality of past game outcome amounts are eligible to be presented as a repeated outcome in at least one future play of the electronic game at the first input amount;

determine a first game outcome associated with a first game outcome amount for a first play of the electronic game at the first input amount;

cause display of the first game outcome amount to be added to the first plurality of past game outcome amounts at the electronic gaming device;

receive an input of a second input amount for a second play of the electronic game; and in response to receiving the input of the second input amount, cause display of the first plurality of past game outcome amounts to be replaced with display of a second plurality of past game outcome amounts associated with the second input amount for the electronic game, wherein one or more of the second plurality of past game outcome amounts are eligible to be presented as a repeated outcome in at least one future play of the electronic game at the second input amount.

11. The electronic gaming system of claim 10, wherein the instructions further cause the at least one processor to cause display of the first game outcome in a first display area and cause the first plurality of past game outcome amounts to be displayed in a second display area.

12. The electronic gaming system of claim 11, wherein the instructions further cause the at least one processor to cause display of at least one outcome amount of the first plurality of past game outcome amounts to be removed from the first display area when display of the first game outcome amount is added to the first plurality of past game outcome amounts in the first display area.

13. The electronic gaming system of claim 12, wherein the at least one outcome amount comprises an oldest outcome amount of the first plurality of past game outcome amounts.

14. The electronic gaming system of claim 10, wherein the instructions further cause the at least one processor to cause the first plurality of past game outcome amounts to be displayed in response to receiving an input of the first input amount for the first play of the electronic game.

15. The electronic gaming system of claim 10, wherein the instructions further cause the at least one processor to cause the first plurality of past game outcome amounts to be displayed based upon the first plurality of past game outcome amounts being stored in a first plurality of data registers associated with the first input amount.

16. The electronic gaming system of claim 15, wherein the instructions further cause the at least one processor to cause the second plurality of past game outcome amounts to be displayed based upon the second plurality of past game outcome amounts being stored in a second plurality of data registers associated with the second input amount.

17. The electronic gaming system of claim 16, wherein one or more of the first plurality of data registers or the second plurality of data registers are stored in the at least one memory, and wherein at least one server comprises the at least one processor and the at least one memory.

18. The electronic gaming system of claim 10, wherein the instructions further cause the at least one processor to at least one of cause the first plurality of past game outcome amounts to be displayed, cause display of the first game outcome amount to be added to the first plurality of past game outcome amounts, or cause the second plurality of past game outcome amounts to be displayed by transmitting one or more messages to the electronic gaming device where the electronic game is displayed.

19. The electronic gaming system of claim 10, wherein the instructions further cause the at least one processor to receive the input of the second input amount from the electronic gaming device.

20. A method of electronic gaming implemented by at least one processor in communication with at least one memory, the method comprising:

controlling display of a first plurality of past game outcome amounts associated with a first input amount for an electronic game, wherein one or more of the first plurality of past game outcome amounts are eligible to be presented as a repeated outcome in at least one future play of the electronic game at the first input amount;

identifying a first game outcome associated with a first game outcome amount for a first play of the electronic game at the first input amount;

controlling display of the first game outcome amount to be added to the first plurality of past game outcome amounts;

identifying an input of a second input amount for a second play of the electronic game; and in response to receiving the input of the second input amount, controlling display of the first plurality of past game outcome amounts to be replaced with display of a second plurality of past game outcome amounts associated with the second input amount for the electronic game, wherein one or more of the second plurality of past game outcome amounts are eligible to be presented as a repeated outcome in at least one future play of the electronic game at the second input amount.

* * * * *